(No Model.) 3 Sheets—Sheet 1.
F. W. WIESEBROCK.
PROCESS OF AND APPARATUS FOR COOLING AND DRYING MALT, GRAIN, AND OTHER SUBSTANCES.
No. 374,102. Patented Nov. 29, 1887.
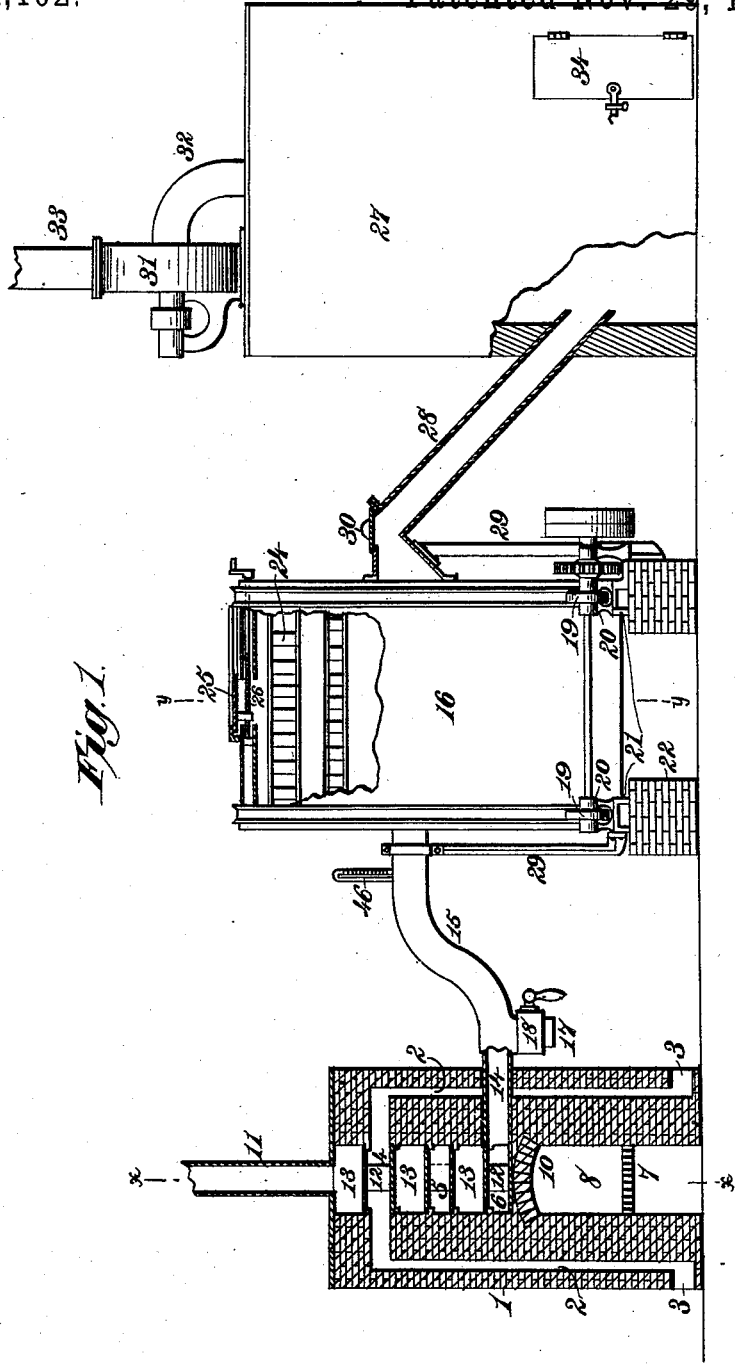
Witnesses.
Robert Smett.
Geo. W. Rea.
Inventor.
Frederick W. Wiesebrock
By James L. Norris
Atty.

(No Model.) 3 Sheets—Sheet 2.
F. W. WIESEBROCK.
PROCESS OF AND APPARATUS FOR COOLING AND DRYING MALT, GRAIN, AND OTHER SUBSTANCES.
No. 374,102. Patented Nov. 29, 1887.
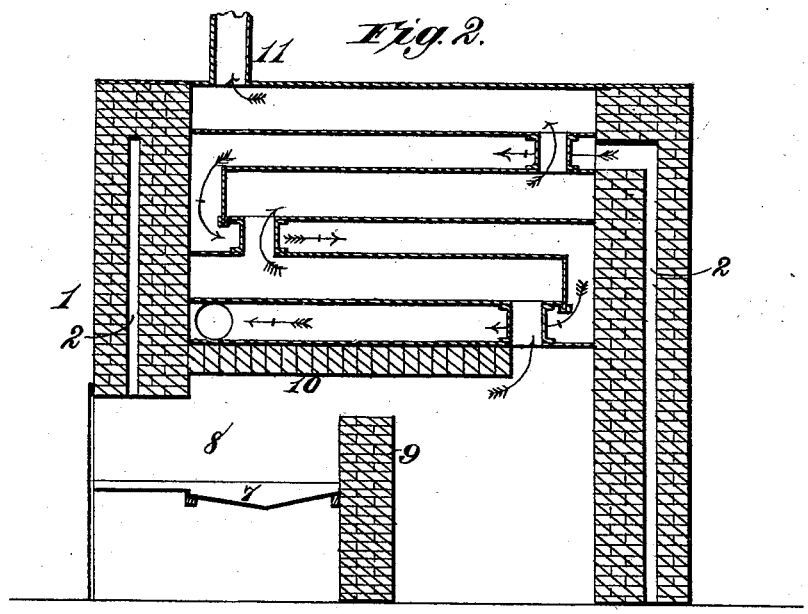
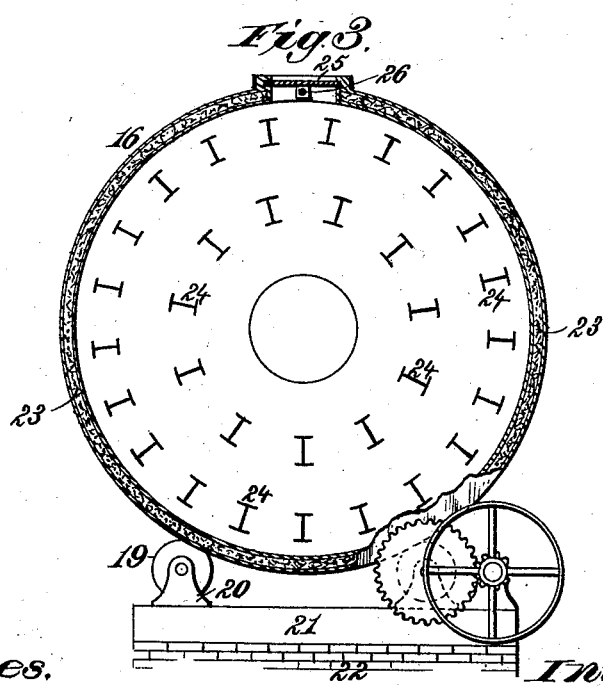
Witnesses. Inventor.
Robert Everett, Frederick W. Wiesebrock.
Dennis Sumby. By James L. Norris,
Atty.

(No Model.)  3 Sheets—Sheet 3.

F. W. WIESEBROCK.
PROCESS OF AND APPARATUS FOR COOLING AND DRYING MALT, GRAIN, AND OTHER SUBSTANCES.

No. 374,102. Patented Nov. 29, 1887.

Witnesses,
Robert Everett
Dennis Sumby

Inventor,
Frederick W. Wiesebrock.
By James L. Norris
Atty.

N. PETERS, Photo-Lithographer, Washington, D. C.

UNITED STATES PATENT OFFICE.

FREDERICK W. WIESEBROCK, OF NEW YORK, N. Y., ASSIGNOR OF TWO-THIRDS TO JOHN B. SMITH AND ISAAC L. SMITH, OF SAME PLACE.

PROCESS OF AND APPARATUS FOR COOLING AND DRYING MALT, GRAIN, AND OTHER SUBSTANCES.

SPECIFICATION forming part of Letters Patent No. 374,102, dated November 29, 1887.

Application filed September 9, 1886. Serial No. 213,120. (No model.)

*To all whom it may concern:*

Be it known that I, FREDERICK W. WIESE-BROCK, a citizen of the United States, residing at New York, in the county of New York and State of New York, have invented new and useful Improvements in Process of and Apparatus for Cooling and Drying Malt, Grain, and other Substances, of which the following is a specification.

This invention has for its objects to provide a novel method or process of cooling and drying malt for the manufacture of extra pale beer without the use of unmalted material and extracting and cleaning the same from rootlets or sprouts and other substances to be retained or preserved; to provide a novel apparatus for cooling and drying malt, grain, and other substances by traveling currents of air and collecting from the latter the particles of the substances carried off by such air; to utilize the heat generated in the drying operation, and to adapt the apparatus for drying malt and grain and also such sticky substances as fish, blood, and other offal used in the manufacture of artificial manure.

The objects of my invention I accomplish in the manner and by the means hereinafter described and claimed, reference being made to the accompanying drawings, in which—

Figure 4:
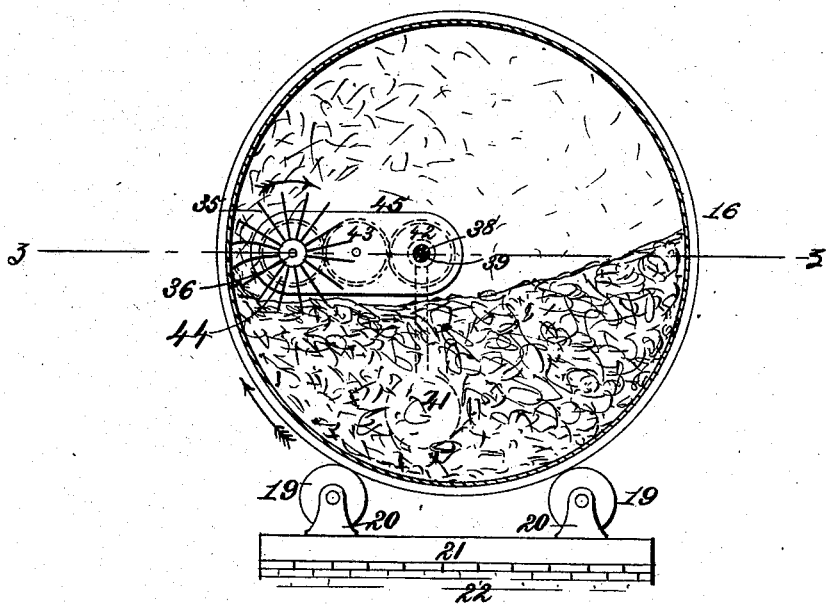

Figure 1 is an elevation, with parts broken away, of an apparatus embodying my invention for cooling and drying malt or grain; Fig. 2, a vertical sectional view taken through the heating-furnace on the line *x x* of Fig. 1; Fig. 3, a sectional view taken through the drying-cylinder on the line *y y* of Fig. 1; Fig. 4, a view similar to Fig. 3, showing a modification in the construction of the drying-cylinder to adapt it for agitating and drying sticky substances; and Fig. 5, a sectional view taken on the line *z z* of Fig. 4.

Heretofore and prior to my invention various means have been devised for drying and cooling malt. Among these it has been proposed to extract the moisture from atmospheric air by driving the air over pipes containing a refrigerating-liquid, and then to force the dry air through the malt. It has also been proposed to heat the air thus dried before forcing it through the grain, in order to effect a quick and powerful absorption of the contained moisture, and, finally, after the drying is completed, to force cold air through to cool the substance down to a normal point.

In the manufacture of malt, and especially that grade of malt used in the production of pale beer, it is absolutely essential that the drying and cooling shall be carried on in substantially the manner hereinafter described, as the whole object will otherwise be frustrated. The principle of drying malt of first-class quality depends upon the gradual elimination of the moisture therefrom and a complete removal thereof from the inner kernel of the grain without such excess of temperature as to discolor the albuminoids, which lie close to the inner shell. I have found, also, that in order to thoroughly effect the elimination of moisture without producing an unsightly contraction or shriveling of the outer shell or hull which surrounds the soft core of the grain, whereby the appearance of the malt is greatly injured and the complete extraction of the inner moisture rendered difficult, if not impossible, it is necessary to conduct the drying process in accordance with the following description. In other words, my invention consists in a process of drying and cooling malt, consisting in subjecting the same, while in agitation, to the action of a current of air the temperature of which is gradually increased from the normal point to about 100° Fahrenheit, at which temperature the drying process is continued until the rootlets or sprouts are dried and carried off by the blast. The temperature is then again increased gradually until it reaches 125° or 160° Fahrenheit, at which point the drying process is finished. Cold air is then driven through the malt until its temperature is reduced again to the normal point, when the malt is ready for storage without needing cleaning. The malt thus treated is perfectly dried, is free from all discoloration of the albuminoids, whereby it is especially adapted to the manufacture of pale beer of the best quality, and the grain is not only of handsome appearance and free from the wrinkled and shriveled condition so often met with, but may be safely stored for an indefinite period.

My invention also contemplates means for avoiding the production of what is known as "glass malt," produced by the absorption of moisture by malt which is nearly dry and then bringing such malt into contact with heat, whereby the starchy portion of the grain is converted into a baked paste.

In order to enable those skilled in the art to make and use my invention, I will now describe the same in detail, referring to the drawings, wherein—

The numeral 1 indicates the brick-work of the air-heating furnace, the walls of which are furnished with vertical flues 2, taking external air at or near the bottom, as at 3, and communicating at their top with the upper one of a series of air-heating boxes, 4, 5, and 6, composed of metal plates supported by the furnace brick-work in a chamber above the fire-grate 7, combustion-chamber 8, and bridge-wall 9. The lower heating-box, 6, is protected from the direct action of the flames by a fire-brick arch, 10. The products of combustion pass to the chimney 11 through tubes 12, extending through the air-heating boxes and through passages 13, located between said boxes and the top wall or plate of the furnace. The lower air-heating box is provided with a pipe-connection, 14, extending through the side wall of the furnace and communicating with a tube, 15, connected with a rotating drying-cylinder, 16, said tube having a tubular extension, 17, open to the external atmosphere and provided with a valve, 18, so that by opening the valve cold air will be admitted to the tube 15 and thence to the cylinder. The cylinder is supported by and rotates on rollers 19, having their bearings in brackets 20, secured to beams 21, which rest upon brick or other suitable foundations, 22, to make rigid supports. The cylinder is composed of a double shell of metal, with the intervening space filled with some non-heat-conducting material, 23, and the cylinder is provided interiorly with a series of stirring or agitating shovels or blades, 24, while a sliding door, 25, operated by a screw-shaft, 26, serves to open and close the orifice through which the material to be cooled and dried is introduced.

In order to facilitate the discharging of the dried malt from the cylinder, there is left a space of a few inches between the stirrers or shovels and the inner shell of the cylinder, so as to allow the dried grains to slip through this space so formed to the bottom of the cylinder when the same stands with its man-hole downward and open for discharge.

Figure 5:
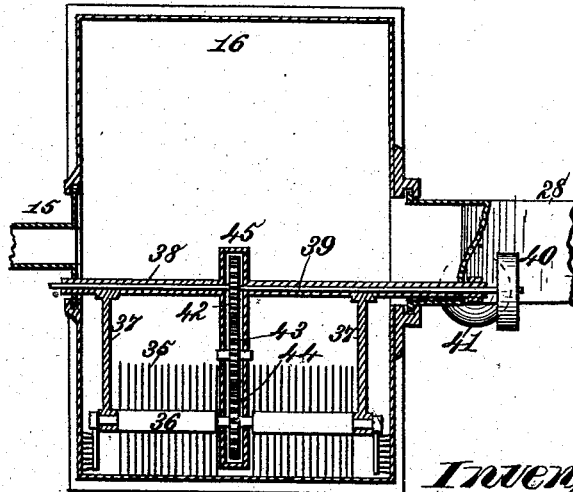

The collecting-chamber 27 is located at the side of the cylinder opposite the air-heating furnace and is connected with the cylinder by the inclined outlet-spout 28, having its lower end passed through the wall of the collecting-chamber and its upper end enlarged and fitted practically air-tight in an annular groove in the drum, the tube 15 being likewise fitted to the cylinder, as shown in Fig. 5, whereby said cylinder can rotate, while the tube and spout remain stationary, at the same time providing sufficiently tight joints between these parts to suit the conditions required. The inlet-tube and outlet-spout are rigidly supported by the side standards, 29, and the spout is furnished at its upper end with an orifice opened and closed by a cover, 30, for the purpose of obtaining samples of the material being dried.

On the top part of the collecting-chamber is located an exhaust-fan, 31, communicating by an elbow, 32, with said chamber, and having a discharge-pipe, 33, for the exit of the moist air. A door, 34, permits access to the chamber, as occasion may demand. The cylinder shown in Figs. 1 and 3 is more particularly designed for cooling and drying malt or grain for the manufacture of extra pale beer; but to adapt the apparatus for drying sticky substances—such as fish, blood, and other offal used in the manufacture of artificial manure—I employ the cylinder illustrated in Figs. 4 and 5. In this instance the shovels or blades are omitted, and in lieu thereof I employ a series of blades, wings, or brushes, 35, mounted on a revolving shaft, 36, and moving in contact with the interior smooth surface of the cylinder. The shaft carrying the blades, wings, or brush is journaled at its ends in arms 37, secured to a sleeve, 38, surrounding a shaft, 39, both of which project at one end through the side of the cylinder, the shaft having a driving-pulley, 40, and the sleeve being provided with a weighted rod, 41, for counterbalancing the arms 37 in the cylinder. The shaft 39 carries a gear-wheel, 42, engaging a pinion, 43, which drives a gear-wheel, 44, on the shaft 36, thereby rotating the blades, wings, or brush, and this gearing is covered and protected by a metallic or other casing, 45, secured to the sleeve. The action of the blades, wings, or brush is such as to throw the material upward through the space in the cylinder, and thus agitate and expose the same to the current of air, while at the same time the blades or brush keep the interior surface of the cylinder clear from the sticky substances.

In drying and cooling malt for the manufacture of extra pale beer, the cylinder shown in Figs. 1 and 3 is charged about half-full with the moist or wet grain, the cylinder is rotated, the valve 18 is opened to admit cold air or air of the usual temperature of about 60° Fahrenheit into the inlet-tube 15 at a point outside the furnace, and the exhaust-fan is set in motion, thereby drawing the cold air through the inlet-tube, the cylinder, and the spout into the collecting-chamber, this being continued a short time, according to the condition of the malt as to contained moisture, before raising the temperature of the air. The cold-air valve is then so regulated in connection with the hot-air valve that a small proportion of hot air from the furnace is mingled with the cold-air current, this proportion being gradually increased, as the process continues, until the temperature of the inflowing air has reached 100° Fahrenheit. At this point the temperature is retained until the rootlets or sprouts, which are the first to dry and are then readily removed, have been carried out of the cylinder and into the collecting-chamber 27. This being accomplished, the temperature of the air is again gradually increased until it reaches 160° Fahrenheit or thereabout, at which point the drying process is completed. Air at the normal temperature is then drawn through the malt until it is restored to its proper temperature, when it is ready to be stored and may be kept for any period.

By my invention I effect a complete drying of the malt without danger of the albuminoids becoming discolored, whereby a malt is obtained that will produce extra pale beer having all the peculiar fine aromas of genuine malt beer, which is not the case in the pale beers as ordinarily made, for the reason that the usual process of malting discolors the albuminoids sufficiently to prevent the manufacture of extra pale beer from all malt. It is for this reason that brewers use more or less unmalted material—such as corn or rice—in the production of pale beer.

In the operation of the apparatus for drying and cooling the malt, the rootlets or sprouts are detached in the rotating cylinder and by the traveling currents of air are carried to and deposited in the collecting-chamber, where said particles as well as all dirt and dust are retained. This result is accomplished during the gradual increase of the air-temperature from the normal point to 100° Fahrenheit, and the rootlets, being light when dry and easily detached, are carried out of the drying-cylinder by the traveling air-current. Moreover, being thin and light, they give off their moisture to the air much more rapidly than the malt-grains, and in consequence they will absorb from the malt, by being mingled with the bulk thereof in the lower part of the cylinder, an undue quantity of moisture and absorb it more rapidly than is consistent with the production of the best quality of malt, and therefore the removal of these rootlets as speedily as possible is essential. Moreover, they contain a principle known as "asparagine," which is of an exceedingly bitter and disagreeable taste, and this flavor is liable to be communicated to the malt if the rootlets remain in and are agitated therewith for any length of time while retaining moisture.

The settling or collecting chamber is constructed of such area that the speed of the air-currents therethrough will be reduced sufficiently to permit the deposition of the particles carried over by such air-currents, thereby avoiding waste.

In the operation of the apparatus for heating the substances to be dried the heated air rising through the flues 2 in the furnace-walls passes through the air-heating boxes in a direction the reverse to that in which the products of combustion pass, as indicated by the arrows, Fig. 2, by which means I utilize the heat ordinarily wasted by radiation through the walls, while the metallic boxes effectually heat the air.

The inlet-tube 15 is provided with a thermometer, 46, to indicate the temperature of the air, which can be regulated and controlled through the medium of the valve 18 by admitting more or less cold air.

The processes hereinbefore in use and mentioned in the beginning of this specification will not accomplish the results I propose and are not applicable to the drying of malt from which pale beer is to be made, or, in fact, beer of any superior grade. In the one class of cases the albuminoids of the grain are discolored; in another the use of air freed from all moisture by refrigeration will produce such a rapid evaporation that the inner moisture contained in the mealy core cannot follow, and a hard, dry, wrinkled, and shriveled shell is produced, which ruins the appearance of the grain. Moreover, the air when brought to a point at or near freezing destroys the solubility of the diastase to a greater or less degree, and thereby removes its power to convert the starch of the grain into glucose. These objections are wholly removed by my process.

Having thus described my invention, what I claim is—

1. The process herein described of drying malt and other materials, consisting in first subjecting the same, while agitated, to the action of currents of air of normal temperature and gradually increasing the temperature of such air, substantially as set forth.

2. The process herein described of drying and cooling malt and other substances, consisting in first subjecting the same, while agitated, to the action of currents of air of normal temperature, then gradually increasing the temperature of said air, and, finally, drawing air of normal temperature through the dried malt to cool the same, substantially as set forth.

3. The process herein described for drying and cooling malt, consisting in first subjecting the same, while agitated, to the action of a current of air of normal temperature, then gradually heating the air-current to 100° Fahrenheit, or thereabout, and continuing the treatment until the rootlets have been removed, then gradually increasing the temperature to 160° Fahrenheit, and, finally, subjecting the dried malt to a current of air of normal temperature until cooled, substantially as set forth.

4. The combination of a furnace having cold-air flues in its walls and provided with communicating metallic air-heating boxes, a rotating cylinder, a tube connecting the latter with one of the air-heating boxes and provided with a valve for admitting cold air into said tube, a collecting-chamber, an air-outlet spout connecting the cylinder with the chamber, and an exhaust-fan communicating with the said chamber, substantially as and for the purposes described.

5. The combination, with the rotating cylinder, the shaft, and sleeve, of the rotating shaft carrying blades or their described equivalent, the arms extending from the sleeve and carrying the blade shaft, and gearing between the latter and the shaft in the sleeve, substantially as described.

In testimony whereof I affix my signature in presence of two witnesses.

FREDERICK W. WIESEBROCK.

Witnesses:
L. ARNSTEIN,
JAMES H. KEYMER.